(12) United States Patent
Kosaka

(10) Patent No.: US 7,917,025 B2
(45) Date of Patent: Mar. 29, 2011

(54) IMAGE PICKUP APPARATUS

(75) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/105,501

(22) Filed: Apr. 18, 2008

(65) Prior Publication Data

US 2009/0041446 A1 Feb. 12, 2009

(30) Foreign Application Priority Data

Aug. 7, 2007 (JP) ................................. 2007-205370

(51) Int. Cl.
*G33B 13/02* (2006.01)
(52) U.S. Cl. ..................... 396/148; 396/296; 348/333.01
(58) Field of Classification Search ..................... 396/80, 396/100, 104, 111, 125, 148, 213, 296; 348/333.01
See application file for complete search history.

(56) References Cited

U.S. PATENT DOCUMENTS

| 5,557,358 | A | * | 9/1996 | Mukai et al. | 396/296 |
| 6,453,124 | B2 | * | 9/2002 | Morimoto et al. | 396/91 |
| 7,657,171 | B2 | * | 2/2010 | Sundstrom | 396/133 |
| 2007/0030376 | A1 | * | 2/2007 | Kosaka | 348/335 |
| 2007/0280671 | A1 | * | 12/2007 | Kosaka | 396/159 |

FOREIGN PATENT DOCUMENTS

| JP | 5-107595 A | 4/1993 |
| JP | 2001-272593 A | 10/2001 |

* cited by examiner

*Primary Examiner* — W. B. Perkey
*Assistant Examiner* — Warren K Fenwick
(74) *Attorney, Agent, or Firm* — Canon U.S.A., Inc. I.P. Division

(57) ABSTRACT

An image pickup apparatus is provided that can switch between an optical viewfinder mode for identifying an object using an optical viewfinder and a live view mode for identifying an image of an object using a monitor. The apparatus includes an auto-focus unit able to be configured in the optical viewfinder mode; and a control unit configured to switch, in a case where a mode for performing exposure control in association with an auto-focus result obtained by the auto-focus unit is set, when the optical viewfinder mode is switched to the live view mode, to a mode for performing exposure control not in association with the auto-focus result.

5 Claims, 9 Drawing Sheets

IMAGE PICKUP APPARATUS

BACKGROUND OF THE INVENTION

1. Field of the Invention

The present invention relates to image pickup apparatuses capable of switching between an optical viewfinder and a live view mode.

2. Description of the Related Art

Many cameras having, besides a known optical viewfinder, an electronic viewfinder that obtains an image in an image pickup range using an image pickup device and displays the obtained image using a liquid crystal display monitor or the like (hereinafter referred to as a live view function or mode) have been proposed. Features of the live view function include strength against external darkness, that is, a reduction in luminance, ease of checking the depth of field, ease of performing special display such as enlargement, and the like.

Single-lens reflex cameras achieve focus using a phase-difference auto-focus (AF) method of achieving focus by separating light that has passed through an image pickup lens into components using a separator lens and obtaining the amount of lens movement based on the distance between images. Most of cameras of this type having the live view function use a contrast AF method of achieving focus based on contrast of image data obtained by an image pickup device.

In order to make use of features of the optical viewfinder and the live view mode, a single-lens reflex camera that switches between the optical viewfinder and the live view function has been proposed in Japanese Patent Laid-Open No. 5-107595.

When a camera can switch between the optical viewfinder and the live view mode, the camera performs the phase-difference AF method when using the optical viewfinder and performs the contrast AF method in the live view mode. The phase-difference AF method has an excellent focus speed. The contrast AF method has excellent focus precision. The two AF methods have respective features. There may be a situation where a user of the camera wants the camera to perform the phase-difference AF method even in the live view mode. To do so, a camera that can switch between the AF methods has been proposed in, for example, Japanese Patent Laid-Open No. 2001-272593.

Single-lens reflex cameras are often required to have a snap-shooting ability. Even when single-lens reflex cameras have the live view function, they may not use the contrast AF method, which requires a long time to achieve focus. In this case, focus in the live view mode is basically achieved with manual focus. Unlike a normal operation where AF is set by the first stroke of a release button and then an image is captured by the second stroke of the release button, an image can be captured without regard to a focus position. In such a case, when the phase-difference AF method is enabled by a user operation, the mode is changed to the optical viewfinder mode for a necessary period, an AF operation is performed using the phase-difference AF method, and then the mode is changed back to the live view mode.

However, in the phase-difference AF method using the optical viewfinder, some functions are in association with a photometric program using the optical viewfinder. These functions include an automatic depth-of-field priority AF function (hereinafter called "auto-depth", which will be described in detail later) and an auto-exposure (AE) lock function that locks a photometric value when focus is achieved based on an evaluation photometry result at a focus ranging point. When the optical viewfinder and the live view function use different photometric methods, if the mode returns to the live view mode after an AF operation using the phase-difference AF method has been performed and photometry is performed with a photometric method in the live view mode, inconsistency may be caused.

SUMMARY OF THE INVENTION

The present invention provides an image pickup apparatus that can avoid inconsistency in AF and a photometric method when an optical viewfinder and a live view mode are switchable from one to the other.

According to an aspect of the present invention, there is provided an image pickup apparatus that can switch between an optical viewfinder mode for identifying an object using an optical viewfinder and a live view mode for identifying an image of an object using a monitor. The image pickup apparatus includes an auto-focus unit able to be configured in the optical viewfinder mode; and a control unit configured to switch, in a case where a mode for performing exposure control in association with an auto-focus result obtained by the auto-focus unit is set, when the optical viewfinder mode is switched to the live view mode, to a mode for performing exposure control not in association with the auto-focus result.

According to the aspect of the present invention, it is possible to provide an image pickup apparatus that can avoid inconsistency in AF and a photometric method when an optical viewfinder and a live view mode are switchable from one to the other.

Moreover other embodiments, features, and aspects of the present invention will become more apparent from the following detailed description taken in association with the accompanying drawings.

DESCRIPTION OF THE EMBODIMENTS

The present invention will now be described in detail with reference to the drawings showing preferred embodiments thereof.

Figure 1:
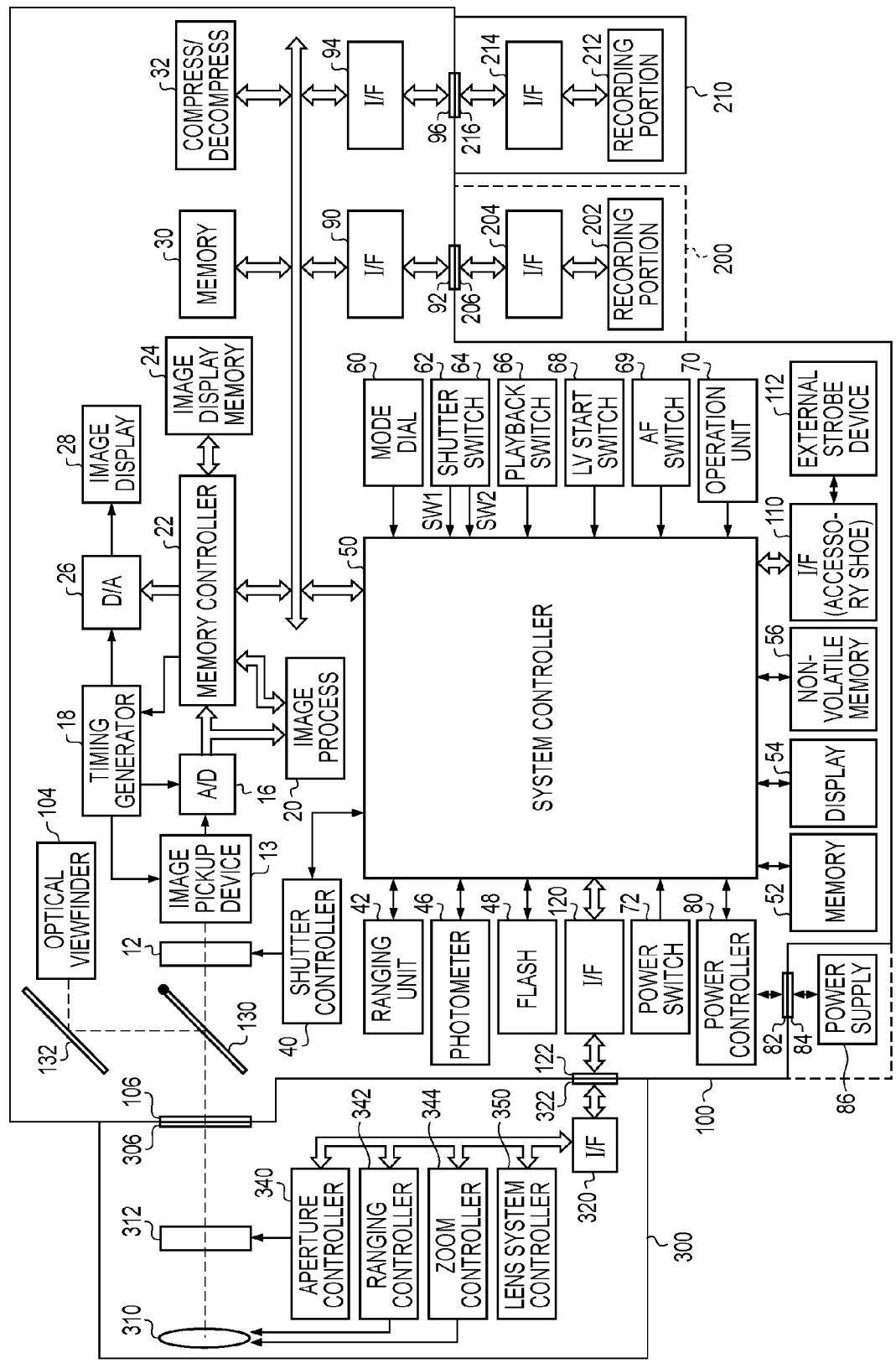
FIG. 1 is a block diagram of an example image pickup apparatus according to an embodiment of the present invention.

FIG. 1 is a block diagram of an image pickup apparatus having a live view mode according to an embodiment of the present invention. The image pickup apparatus includes a main body 100 of the apparatus, recording media 200 and 210, and a replaceable-type lens unit 300.

The internal structure of the main body 100 is described below. The main body 100 includes a shutter 12 that controls the exposure amount; an image pickup device 13 that converts an optical image formed through the shutter 12 into an electrical signal; an analog-to-digital (A/D) converter 16 that converts an analog signal from the image pickup device 13 into a digital signal; and a timing generator 18 that provides a clock signal and a control signal to the image pickup device 13, the A/D converter 16, and a digital-to-analog (D/A) converter 26, and that is controlled by a memory controller 22 and a system controller 50, which are described later.

Furthermore, the main body 100 includes an image processing unit 20 that performs predetermined pixel interpolation processing and color conversion processing of data from the A/D converter 16 or data from the memory controller 22. If needed, the image processing unit 20 performs predetermined calculation processing using data of a captured image. Based on the calculation result, the system controller 50 described later controls a shutter controller 40 and a ranging unit 42. That is, the image processing unit 20 performs through-the-lens (TTL) AF processing. Furthermore, the image processing unit 20 performs AE processing and electronic flash (EF) processing. The image processing unit 20 also performs predetermined calculation processing using the captured image data and performs TTL automatic white balance (AWB) processing based on the obtained calculation result.

In the present embodiment, the ranging unit 42 and a photometer 46 are provided as dedicated units. Therefore, the AF processing, the AE processing, and the EF processing may be performed using the ranging unit 42 and the photometer 46, and the AF processing, the AE processing, and the EF processing may not be performed using the image processing unit 20. Alternatively, the AF processing, the AE processing, and the EF processing may be performed using the ranging unit 42 and the photometer 46, and additionally the AF processing, the AE processing, and the EF processing may be performed using the image processing unit 20. The ranging unit 42 and the photometer 46 are enabled when an optical viewfinder 104 is used.

The main body 100 includes the memory controller 22. The memory controller 22 controls the A/D converter 16, the timing generator 18, the image processing unit 20, an image display memory 24, the D/A converter 26, a memory 30, and a compression/decompression unit 32. Data obtained by the A/D converter 16 is written into the image display memory 24 or the memory 30 via the image processing unit 20 and the memory controller 22 or via the memory controller 22 but not the image processing unit 20.

The main body 100 includes the image display memory 24; the D/A converter 26; an image display unit 28 that includes thin-film transistors (TFTs), a liquid crystal display (LCD), and the like and that displays image data for display, which is written in the image display memory 24, via the D/A converter 26; and the memory 30 that stores captured still images. The memory 30 has a sufficient storage capacity for storing a predetermined number of still images. Therefore, even in a continuous photographing operation where multiple still images are consecutively captured, many images can be quickly written into the memory 30. The memory 30 may also be used as a work area for the system controller 50.

The main body 100 includes the compression/decompression unit 32. The compression/decompression unit 32 compresses/decompresses image data using an adaptive discrete cosine transform (ADCT) or the like. The compression/decompression unit 32 reads an image stored in the memory 30, compresses or decompresses the image, and writes the processed data into the memory 30.

The main body 100 includes the shutter controller 40. The shutter controller 40 controls the shutter 12 in association with an aperture controller 340 that controls an aperture 312 based on photometric information provided from the photometer 46. The ranging unit 42 is a ranging unit for performing the AF processing. A light beam incident on a lens 310, which will be described later, is directed to enter the ranging unit 42 via the aperture 312, lens mounts 306 and 106, a mirror 130, and a ranging submirror (not shown) using a single-lens reflex method. With the ranging unit 42, a focus state of an image formed as an optical image can be measured.

The photometer 46 is a photometer for performing the AE processing. A light beam incident on the lens 310 is directed to enter the photometer 46 via the aperture 312, the lens mounts 306 and 106, the mirror 130, a mirror 132, and a photometric lens (not shown) using a single-lens reflex method. With the photometer 46, an exposure state of an image formed as an optical image can be measured. The photometer 46 also has the EF processing function by operating in association with a flash 48.

The main body 100 includes the flash 48. The flash 48 has a floodlight function for AF auxiliary light and a flash adjusting function. AF control may be performed using the measurement result obtained by the ranging unit 42 and the calculation result obtained by the image processing unit 20 using image data captured by the image pickup device 13. Furthermore, exposure control may be performed using the measurement result obtained by the photometer 46 and the calculation result obtained by the image processing unit 20 using the image data captured by the image pickup device 13.

The main body 100 includes the system controller 50 for controlling the overall main body 100; a memory 52 that stores constants, variables, and programs for operating the system controller 50; and a display unit 54 that includes an LCD, a loudspeaker, and the like and that indicates the operating state or a message using characters, images, and sounds in accordance with a program executed by the system controller 50. The display unit 54 is provided at a single place or multiple places near an operation unit(s) of the main body 100 where the display unit 54 is clearly visible. The display unit 54 includes a combination of, for example, an LCD, a light-emitting diode (LED), a sound generating element, and the like. Some of the functions of the display unit 54 are provided in the optical viewfinder 104.

Among indicators displayed on the display unit 54, for example, the following are displayed on the LCD or the like: a single/continuous photographing mode indicator, a self-timer indicator, a compression-ratio indicator, an indicator of the number of recording pixels, an indicator of the number of recorded images, an indicator of the remaining number of images that can be captured, a shutter-speed indicator; an aperture-size indicator, an exposure-correction indicator, a flash-correction indicator, an external-strobe-intensity indicator, a red-eye-effect-reduction indicator, a buzzer-setting indicator, an indicator of the remaining battery level, an error indicator, an indicator of information including a number having multiple digits, an indicator of the attached/detached state of the recording media 200 and 210, an indicator of the attached/detached state of the lens unit 300, an indicator of a communication interface (I/F) operation, a time/date indicator, and an indicator of the connection state with an external computer.

Among indicators displayed on the display unit 54, for example, the following are example parameters displayed on the optical viewfinder 104: a focus indicator, a ready-to-photograph indicator, a shake-warning indicator, a flash-battery-charge indicator, an indicator of completion of flash battery charge, a shutter-speed indicator, an aperture-size indicator, an exposure-correction indicator, and an indicator of a recording-medium writing operation. Among indicators displayed on the display unit 54, for example, an indicator of a recording-medium writing operation or the like is indicated using the LED or the like. Among indicators displayed on the display unit 54, a self-timer notification lamp or the like is indicated using a lamp or the like. The self-timer notification lamp may be commonly used as AF auxiliary light.

The main body 100 includes a non-volatile memory 56, such as an electrically erasable programmable read-only memory (EEPROM), which can be electrically erasable and recordable.

The main body 100 includes operation units 60, 62, 64, 66, 68, 69, and 70 that are used to enter various operating instructions to the system controller 50 and that include single switches or dials or combinations thereof. These operation units 60, 62, 64, 66, 68, 69, and 70 are described in more specific detail below.

The operation unit 60 is a mode switch dial used to switch the mode among various functional photographing modes including an automatic photographing mode, a programmed photographing mode, a shutter speed priority AE photographing mode, an aperture priority AE photographing mode, a manual photographing mode, an automatic depth-of-field photographing (auto-depth) mode, a portrait photographing mode, a landscape photographing mode, a macro photographing mode, a sports photographing mode, a night-scene photographing mode, and a panorama photographing mode.

The operation unit 62 is a shutter switch (hereinafter referred to as a "switch SW1") that is turned on when a shutter button (not shown) is operated halfway and gives various instructions to start operations including the AF processing, the AE processing, the AWB processing, and the EF processing. The operation unit 64 is a shutter switch (hereinafter referred to as a "switch SW2") that is turned on when the shutter button (not shown) is fully operated and gives an instruction to start a series of operations including exposure processing of reading a signal from the image pickup device 13 and writing the signal as image data in the memory 30 via the A/D converter 16 and the memory controller 22, developing processing using the calculation results obtained by the image processing unit 20 and the memory controller 22, and recording processing of reading the image data from the memory 30, compressing the image data using the compression/decompression unit 32, and writing the image data in the recording medium 200 or 210.

The operation unit 66 is a playback switch that gives an instruction to start a playback operation of reading an image that has been captured in a photographing mode from the memory 30 or from the recording medium 200 or 210 and displaying the image using the image display unit 28. The operation unit 68 is a live view (LV) start switch used to start a live view mode. When the live view start switch 68 is turned on, the mirror 130 is flipped up, the shutter 12 is opened up, and an optical image is formed on the image pickup device 13, thereby starting a live view operation. The operation unit 69 is an AF switch used to temporarily perform phase-difference AF using the ranging unit 42 in the live view mode. While the AF switch 69 is being turned on, phase-difference AF is performed by guiding a light beam incident on the lens 310 through a ranging submirror (not shown) and moving the mirror 130 back to a position so that light can be incident on the ranging unit 42. When the AF switch 69 is turned off, the mirror 130 is flipped up again, and the live view operation is resumed.

The operation unit 70 includes various buttons, a touch panel, and the like. More specifically, the operation unit 70 includes a menu button, a set button, a multi-screen-playback new-page button, a flash setting button, a single/continuous/self-timer switching button, a menu movement plus (+) button, a menu movement minus (−) button, a playback-image movement plus (+) button, a playback image movement minus (−) button, a photographing-quality selection button, an exposure-correction button, a flash-correction button, an external-strobe light-amount setting button, a date/time setting button, an image-display on/off switch for turning on and off the image display unit 28, a quick-review on/off switch for setting a quick review function of automatically playing image data immediately after the image has been captured, a compression-mode switch for selecting a compression ratio of Joint Photographic Experts Group (JPEG) compression or for selecting a charge-coupled device (CCD) RAW mode of digitizing a signal obtained by the image pickup device 13 and recording the digital signal in a recording medium, a playback switch for setting various functional modes including a playback mode, a multi-screen playback/delete mode, and a personal-computer (PC) connection mode, and an AF-mode setting switch for setting a one-shot AF mode of starting an AF operation when the switch SW1 is turned on and, once focus is achieved, maintaining an in-focus state and a servo AF mode of continuously performing an AF operation while the switch SW1 is turned on. Regarding the functions of the plus and minus buttons, numbers and functions can be more easily selected when a rotational dial switch is provided.

The main body 100 includes a power switch 72 that switches the power mode of the main body 100 between a power-on mode and a power-off mode. The power switch 72 can also turn on and off power of various auxiliary devices connected to the main body 100, including the lens unit 300, the external strobe, and the recording media 200 and 210.

The main body 100 includes a power controller 80 that includes a battery detector, a direct current (DC)-to-DC (DC/DC) converter, and a switch unit that changes a block to which electrical connection is established. The power controller 80 detects whether a battery is connected, the type of the battery, and the remaining power of the battery. Based on the detection results and an instruction from the system controller 50, the power controller 80 controls the DC/DC converter and supplies a necessary voltage to each of the components including a recording medium for a necessary period of time.

Furthermore, connectors 82, 84 and a power supply 86 including a primary battery, such as an alkaline battery or a lithium battery, a secondary battery, such as a NiCd battery or a Li battery, and an AC adapter are provided. The main body 100 includes interfaces 90 and 94 with recording media including memory cards or hard disks and connectors 92 and 96 that establish connections with recording media including memory cards or hard disks.

In the present embodiment, the interfaces and connectors for attaching the recording media 200 and 210 are provided in pairs. Alternatively, the interfaces and connectors for attaching the recording media 200 and 210 may be provided as single elements or plural elements greater than two. A combination of interfaces and connectors that conform to different standards may be used. As the interfaces and connectors, for example, Personal Computer Memory Card International Association (PCMCIA) cards or compactflash (registered trademark of SanDisk Corporation) cards may be used.

It is assumed that the interfaces 90 and 94 and the connectors 92 and 96 that conform to standards, such as the PCMCIA cards or the compactflash cards, are used. Suppose that various communication cards including a local area network (LAN) card, a modem card, a universal serial bus (USB) card, Institute of Electrical and Electronic Engineers (IEEE) 1394 card, a Small Computer System Interface (SCSI) card, a Personal Handyphone System (PHS) communication card, and the like are connected. Accordingly, image data and management information accompanying the image data can be transferred between the main body 100 of the image pickup apparatus and other computers or peripheral devices including printers.

The main body 100 includes the optical viewfinder 104. A light beam incident on the lens 310 is guided by a single-lens reflex method such that the light beam passes through the aperture 312, the lens mounts 306 and 106, and the mirrors 130 and 132, and an optical image is thus formed on the optical viewfinder 104. Accordingly, an image can be captured only by using the optical viewfinder 104, without using the live view function (electronic viewfinder function) of the image display unit 28. The optical viewfinder 104 includes some of the functions of the display unit 54. That is, for example, the optical viewfinder 104 displays a focus-state indicator, a shake-warning indicator, a flash-battery-charge indicator, a shutter-speed indicator, an aperture-size indicator, and an exposure-correction indicator.

The main body 100 includes an external strobe device 112 attached to the image pickup apparatus with an accessory shoe 110.

The main body 100 includes an interface 120 that connects the main body 100 to the lens unit 300 in the lens mount 106, and a connector 122 that electrically connects the main body 100 to the lens unit 300. The connector 122 allows transfer of a control signal, a state signal, and a data signal between the main body 100 and the lens unit 300. The connector 122 also has the function of supplying power with various voltages. Alternatively, the connector 122 may provide, besides electrical communication, optical communication, audio communication, and the like.

The mirrors 130 and 132 guide a light beam incident on the lens 310 toward the optical viewfinder 104 by using the single-lens reflex method. The mirror 132 may either be a quick-return mirror or a half mirror.

The recording media 200 and 210 are described below. The recording medium 200 includes a memory card, a hard disk, or the like. The recording medium 200 includes a recording portion 202 including a semiconductor memory, a magnetic disk, or the like, an interface 204 with the main body 100, and a connector 206 that establishes a connection with the main body 100. Similarly, the recording medium 210 includes a memory card, a hard disk, or the like. The recording medium 210 includes a recording portion 212 including a semiconductor memory, a magnetic disk, or the like, an interface 214 with the main body 100, and a connector 216 that establishes a connection with the main body 100.

The lens unit 300 is described below. A light beam incident on the lens 310 is guided via the aperture 312, the lens mounts 306 and 106, the mirror 130, and the shutter 12, and an optical image of the light beam is formed on the image pickup device 13. The lens mount 306 is used to establish a mechanical connection between the lens unit 300 and the main body 100. The lens mount 306 includes various functions of electrically connecting the lens unit 300 to the main body 100.

The lens unit 300 includes an interface 320 that establishes a connection between the lens unit 300 and the main body 100 in the lens mount 306, and a connector 322 that electrically connects the lens unit 300 to the main body 100. The connector 322 allows transfer of a control signal, a state signal, and a data signal between the main body 100 and the lens unit 300. The connector 322 also has the function of receiving or supplying power with various voltages. Alternatively, the connector 322 may provide, besides electrical communication, optical communication, audio communication, and the like.

The lens unit 300 includes the aperture controller 340. The aperture controller 340 operates in association with the shutter controller 40 for controlling the shutter 12 so as to control the aperture 312 based on photometric information obtained from the photometer 46. The lens unit 300 includes a ranging controller 342 that controls a focus operation of the image pickup lens 310, a zoom controller 344 that controls a zoom operation of the image pickup lens 310, and a lens system controller 350 that controls the overall lens unit 300. The lens system controller 350 includes a memory that stores constants, variables, programs, and the like for operations and a non-volatile memory. The non-volatile memory stores identification information of the lens unit 300, such as a serial number unique to the lens unit 300, management information, functional information including an open aperture size, a minimum aperture size, and a focal length, and current and past setting values.

Figure 2:
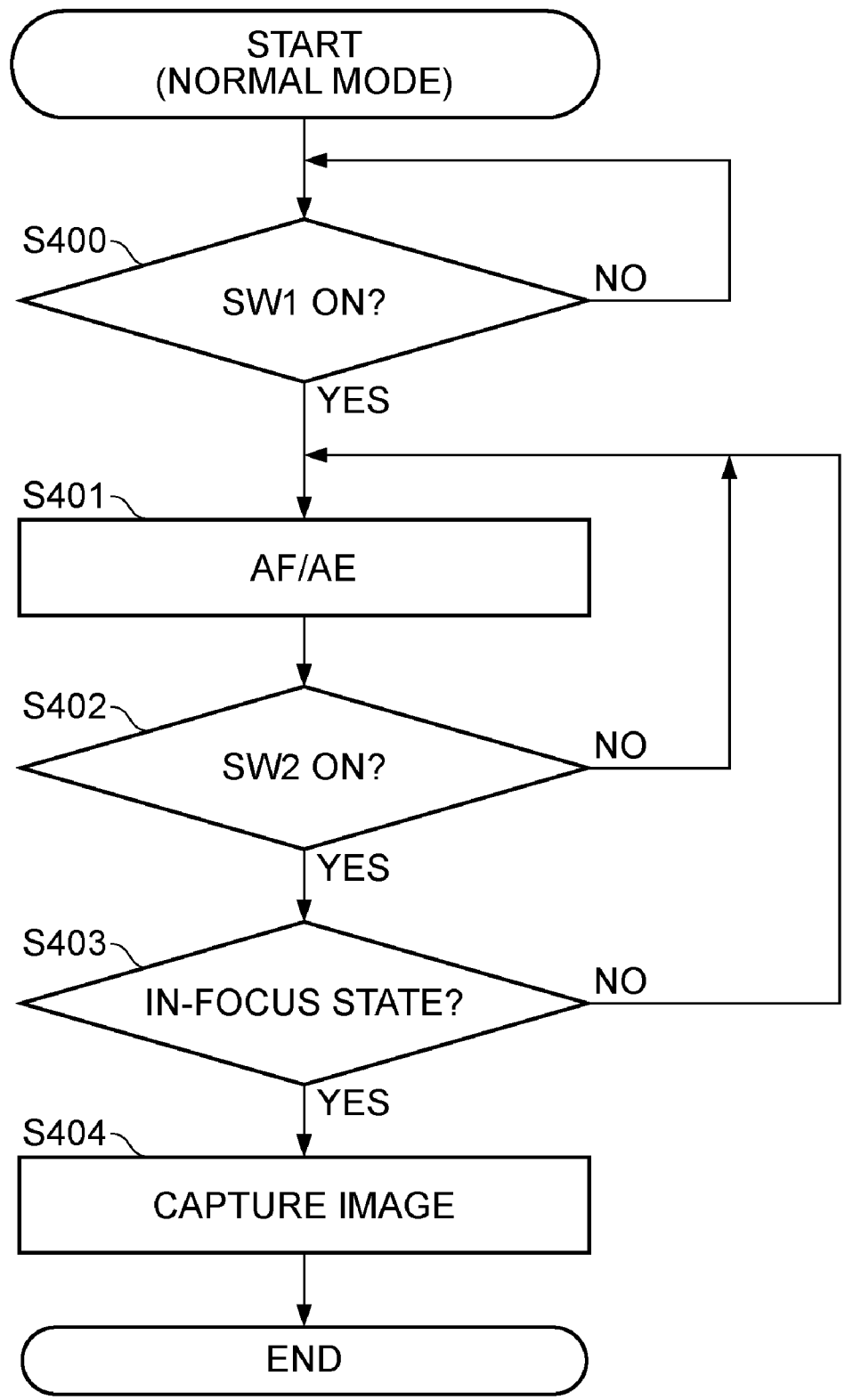
FIG. 2 is a flowchart of an example operation in a normal photographing mode according to the embodiment of the present invention.

Differences in photographing operations in the normal mode and the live view mode are described below. In the normal mode, the image pickup apparatus performs a general single-lens reflex operation. A photographing operation in the normal mode is described using the flowchart shown in FIG. 2.

In step S400, the image pickup apparatus is on standby until the switch SW1 is turned on. When the switch SW1 is turned on, the flow proceeds to step S401. In step S401, the AF processing and the AE processing are started using the ranging unit 42 and the photometer 46. The AF processing is performed in accordance with a selected AF mode. For example, when the on-shot AF mode is selected, the operation is repeated until focus is achieved, and, once focus is achieved, the in-focus state is maintained. In step S402, the state of the switch SW2 is detected. When the switch SW2 is not turned on, the flow returns to step S401, and the AF processing and the AE processing are repeated.

In contrast, when the switch SW2 is turned on, the flow proceeds to step S403. In step S403, whether the in-focus state is maintained or not is determined. If the in-focus state is not maintained, the flow returns to step S401. If the in-focus state is determined to be maintained, the flow proceeds to step S404, and an image is captured.

In the normal mode, AF is always performed as preparation for the photographing operation, as has been described above.

Figure 3:
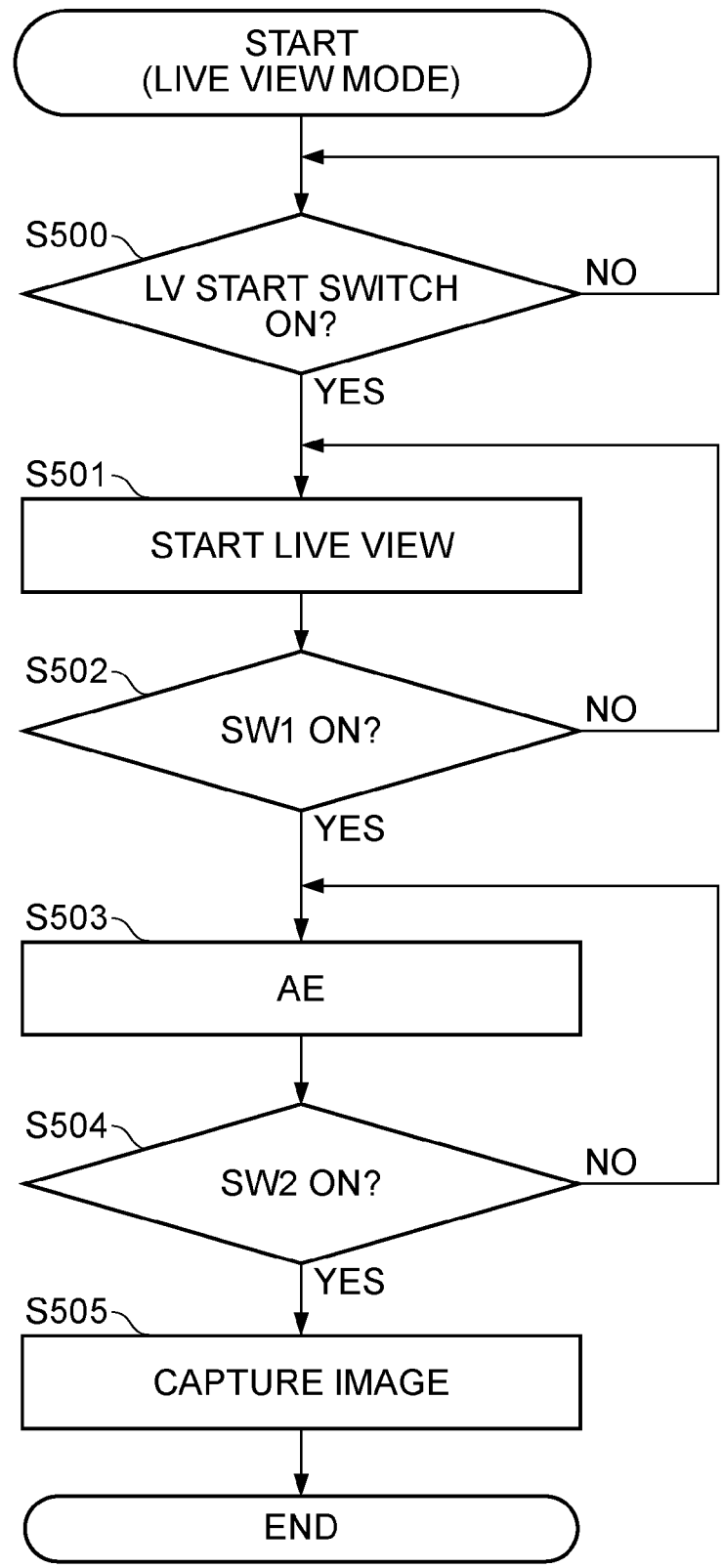
FIG. 3 is a flowchart of an example operation in a live view mode according to the embodiment of the present invention.

A photographing operation in the live view mode is described using the flowchart shown in FIG. 3.

In step S500, the image pickup apparatus is on standby until the live view start switch 68 is turned on. When the live view start switch 68 is turned on, the flow proceeds to step S501. In step S501, a live view operation is started. That is, as has been described above, the mirror 130 is flipped up, the shutter 12 is opened up, and the mode becomes the live view mode. In the live view mode, a real-time image captured by the image processing unit 20 is displayed on the image display unit 28. That is, a live view display operation is performed. In step S502, the state of the switch SW1 is detected. When the switch SW1 is turned off, the flow returns to step S501.

In contrast, when the switch SW1 is turned on, the flow proceeds to step S503. In step S503, AE is performed using the image processing unit 20. Additionally, when the AF processing using the image processing unit 20 can be performed, for example, contrast AF can performed, then, contrast AF is performed. However, in the present embodiment, contrast AF is not essential; the AF processing using the image processing unit 20 may not necessarily be performed.

In step S504, the state of the switch SW2 is detected. When the switch SW2 is turned off, the flow returns to step S503. When the switch SW2 is turned on, the flow proceeds to step S505, and a still image is captured and recorded. In this still-image photographing operation, since the mirror 130 has already been moved up to a position where an optical image can be formed on the image pickup device 13, the mirror 130 need not be driven. Alternatively, the mirror 130 and the shutter 12 may enter a standby state (the mirror 130 is moved down and the shutter 12 is closed), and an image may be captured using the same operation as that in the normal mode.

In the live view mode, AF serving as preparation for a photographing operation is not always necessary. This is because of the following reasons. That is, in the live view mode, an image of an object can be easily enlarged. Thus, manual focus is suitable for the live view mode. Compared with phase-difference AF performed by the ranging unit 42 in the normal mode, contrast AF performed using the image processing unit 20 in the live view mode has a relatively slow response. When manual focus is not selected in the live view mode, if contrast AF can be performed, contrast AF is performed. Otherwise, AF is not performed.

Figure 4:
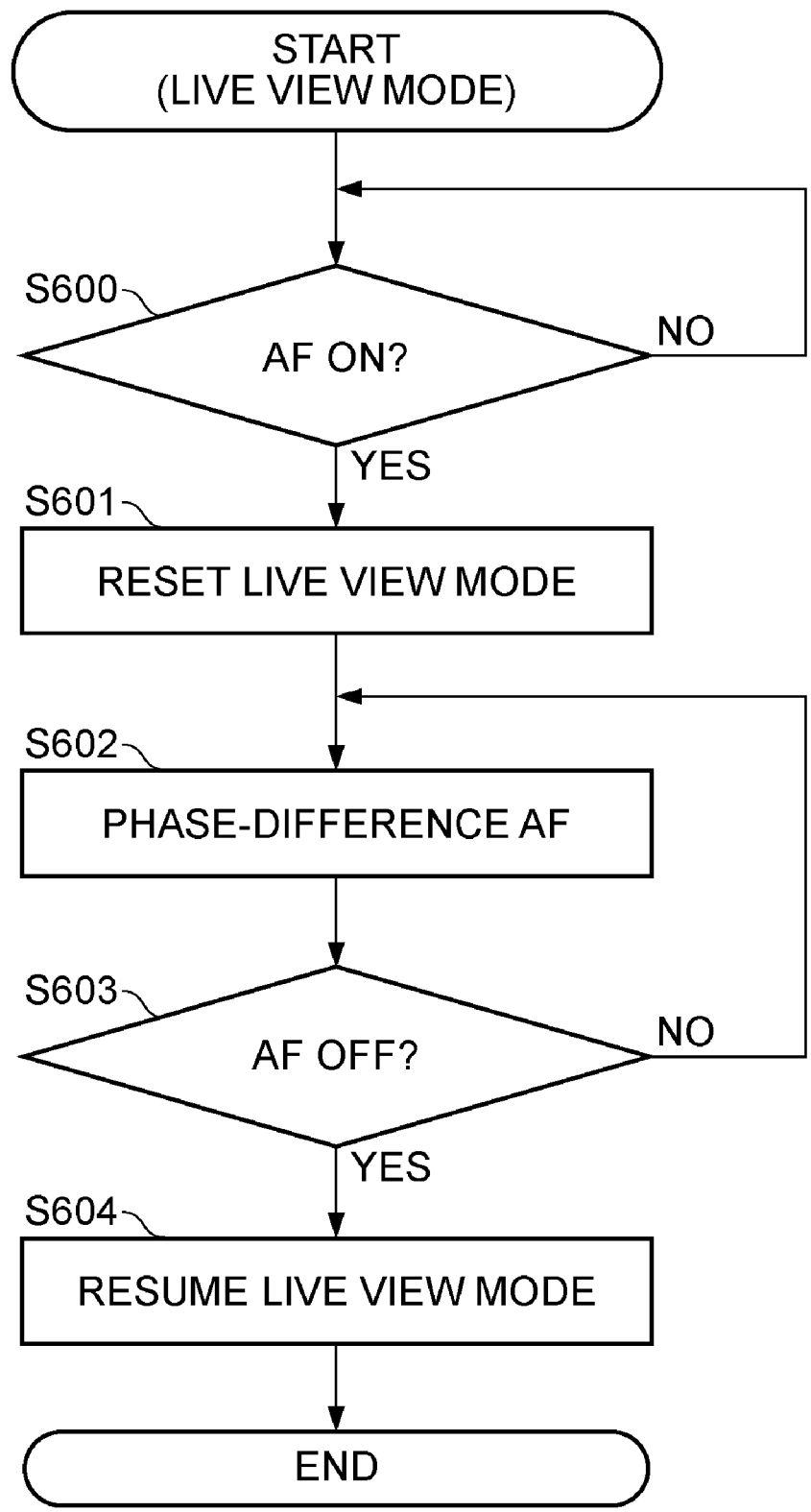
FIG. 4 is a flowchart of an example phase-difference AF operation in the live view mode according to the embodiment of the present invention.

Phase-difference AF performed using the ranging unit 42 in the live view mode is described using the flowchart of FIG. 4.

In step S600, whether the AF switch 69 is turned on in the live view mode to give an AF start instruction is determined. When the AF switch 69 is turned off, the image pickup apparatus is on standby in this step. Thereafter, when the AF switch 69 is turned on, the flow proceeds to step S601. In step S601, the mirror 130 and the shutter 12 are brought back to the standby state, and the live view mode is reset. In step S602, phase-difference AF is started using the ranging unit 42. The same description of the foregoing operation in the normal mode applies to this AF processing.

In step S603, whether the AF switch 69 is turned off is determined. When the AF switch 69 remains to be turned on, the flow returns to step S602, and phase-difference AF is repeated. Thereafter, when the AF switch 69 is turned off, the flow proceeds to step S604. In step S604, the AF processing is terminated, and the mirror 130 and the shutter 12 are controlled to resume the live view mode.

Accordingly, phase-difference AF using the optical viewfinder can be performed even in the live view mode.

An operation where the automatic depth-of-field photographing (auto-depth) mode has been selected in the normal mode is described below.

Figure 5:
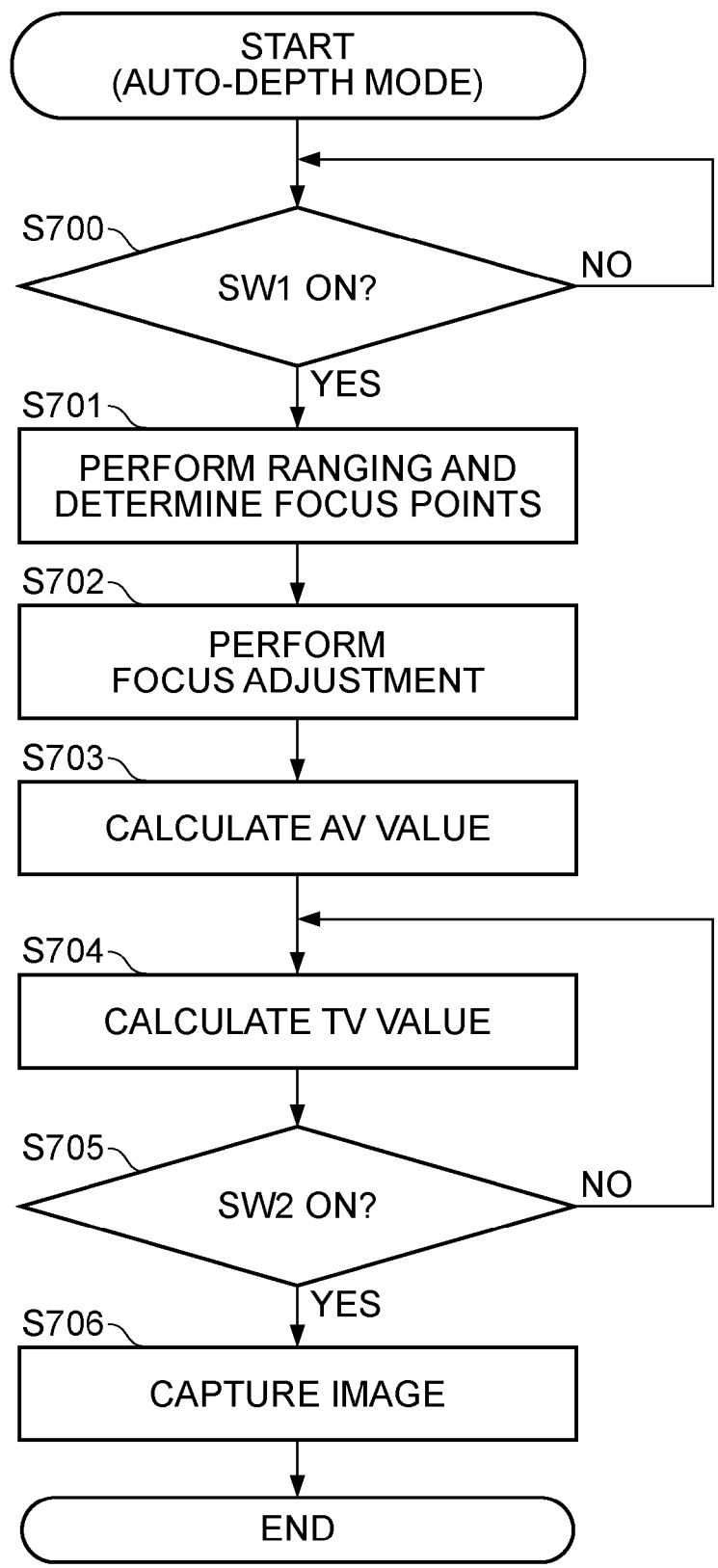
FIG. 5 is a flowchart of an example operation in an auto-depth mode according to the embodiment of the present invention.

The auto-depth mode is a mode where, among ranging points, all focus points where ranging has been successful are adjusted to be closer to the same depth of field. In the auto-depth mode, a photographing aperture size is also controlled according to the depth of field. Even when there are AF mode settings separate from the photographing mode, if the photographing mode is the auto-depth mode, focus adjustment is performed irrespective of the AF mode settings. For example, even when the servo AF mode is selected as the AF mode, a one-shot AF operation giving priority to the depth of field is performed. FIG. 5 is the flowchart of that operation.

In step S700, the image pickup apparatus is on standby until the switch SW1 is turned on. When the switch SW1 is turned on, the flow proceeds to step S701. In step S701, ranging is performed, and focus points are determined. In step S702, focus adjustment is performed. In step S703, a photographing aperture size (AV value) for accommodating the determined focus points in the depth of field is determined. Thereafter, the flow proceeds to step S704. In step S704, an aperture priority ranging calculation is performed using the determined aperture size, and a shutter speed (TV value) is calculated.

In step S705, the state of the switch SW2 is detected. When the switch SW2 is turned off, the flow returns to step S704. That is, when the switch SW2 is not turned on and when the switch SW1 remains to be turned on, the aperture priority ranging operation is continued using the determined aperture size. Every time the photographing luminance changes, the shutter speed is changed. When the switch SW2 is turned on, the flow proceeds to step S706, and an image is captured using the calculated aperture size and the shutter speed.

Figure 6:
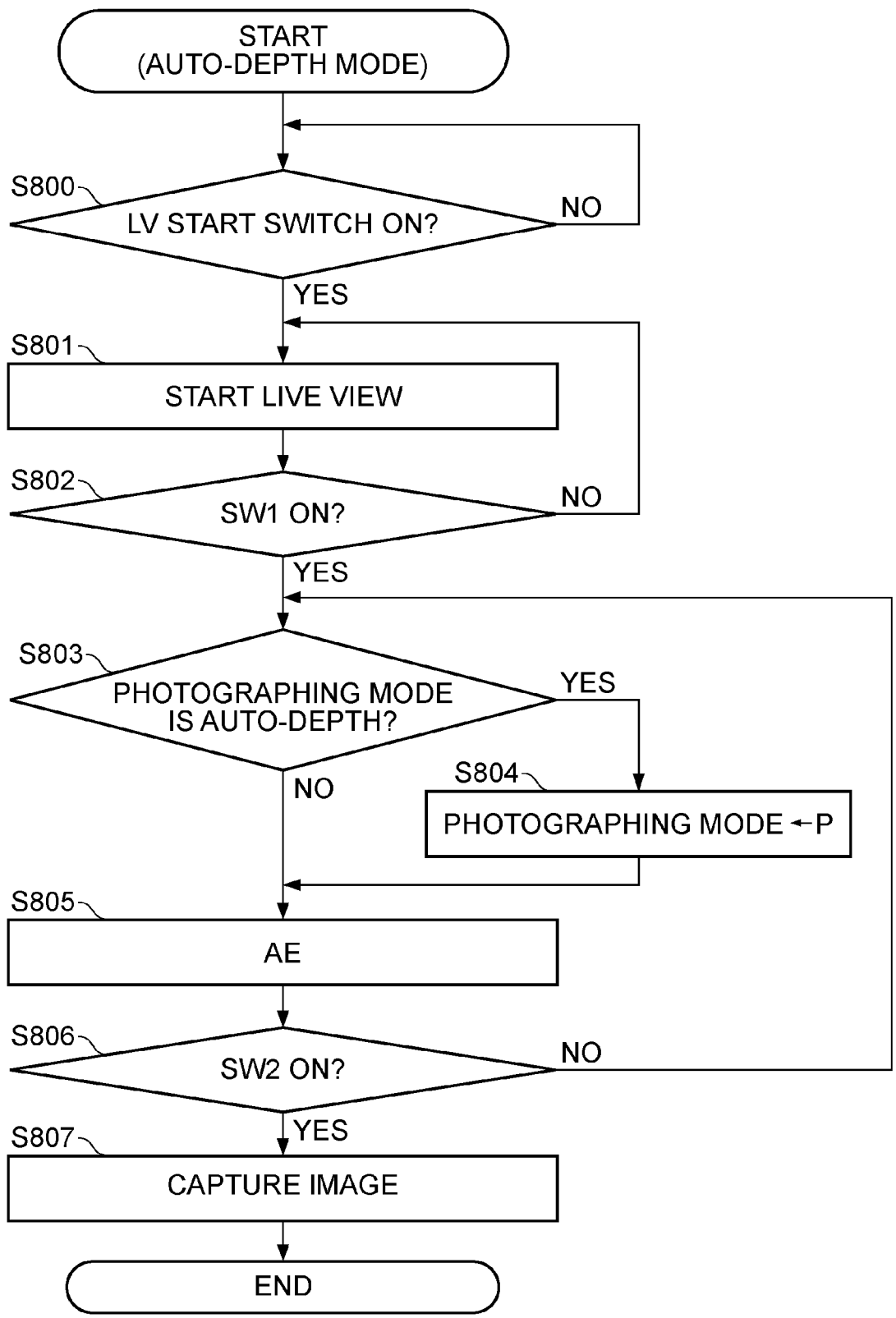
FIG. 6 is a flowchart of an example photographing-mode switching operation in the live view mode according to the embodiment of the present invention.

When the mode changes to the live view mode while the auto-depth mode has been selected, the auto-depth mode is switched to a programmed AE mode. This switching operation is described using the flowchart shown in FIG. 6.

In step S800, the image pickup apparatus is on standby until the live view start switch 68 is turned on. When the live view start switch 68 is turned on, the flow proceeds to step S801. In step S801, as has been described above, the mirror 130 and the shutter 12 are controlled to enter the live view mode. That is, a live view operation is started.

In step S802, the state of the switch SW1 is detected. When the switch SW1 is turned off, the flow returns to step S801, and the live view operation is continued. When the switch SW1 is turned on, the flow proceeds to step S803, and the current photographing mode is determined. Since the current photographing mode is the auto-depth mode, the flow proceeds to step S804. In step S804, the photographing mode (auto-depth mode) is changed to the programmed AE mode (P), and the flow proceeds to step S805. When the current photographing mode is not the auto-depth mode, the flow directly proceeds to step S805.

In step S805, AE is performed using the image processing unit 20. That is, if the current photographing mode is the auto-depth mode, program AE that has been set in step S804 is performed. If the current photographing mode is not the auto-depth mode, AE in a mode that has been set using the mode dial switch 60 is performed. Thereafter, the flow proceeds to step S806, and the state of the switch SW2 is detected. When the switch SW2 is turned off, the flow returns to step S803, and a similar operation is repeated. When the switch SW2 is turned on, the flow proceeds to step S807, and an image is captured using the calculated aperture size and the calculated shutter speed.

Since photometric calculations are performed irrespective of a focus position in the programmed AE mode, a live view operation can be performed irrespective of the focus state in the normal mode.

Figure 7:
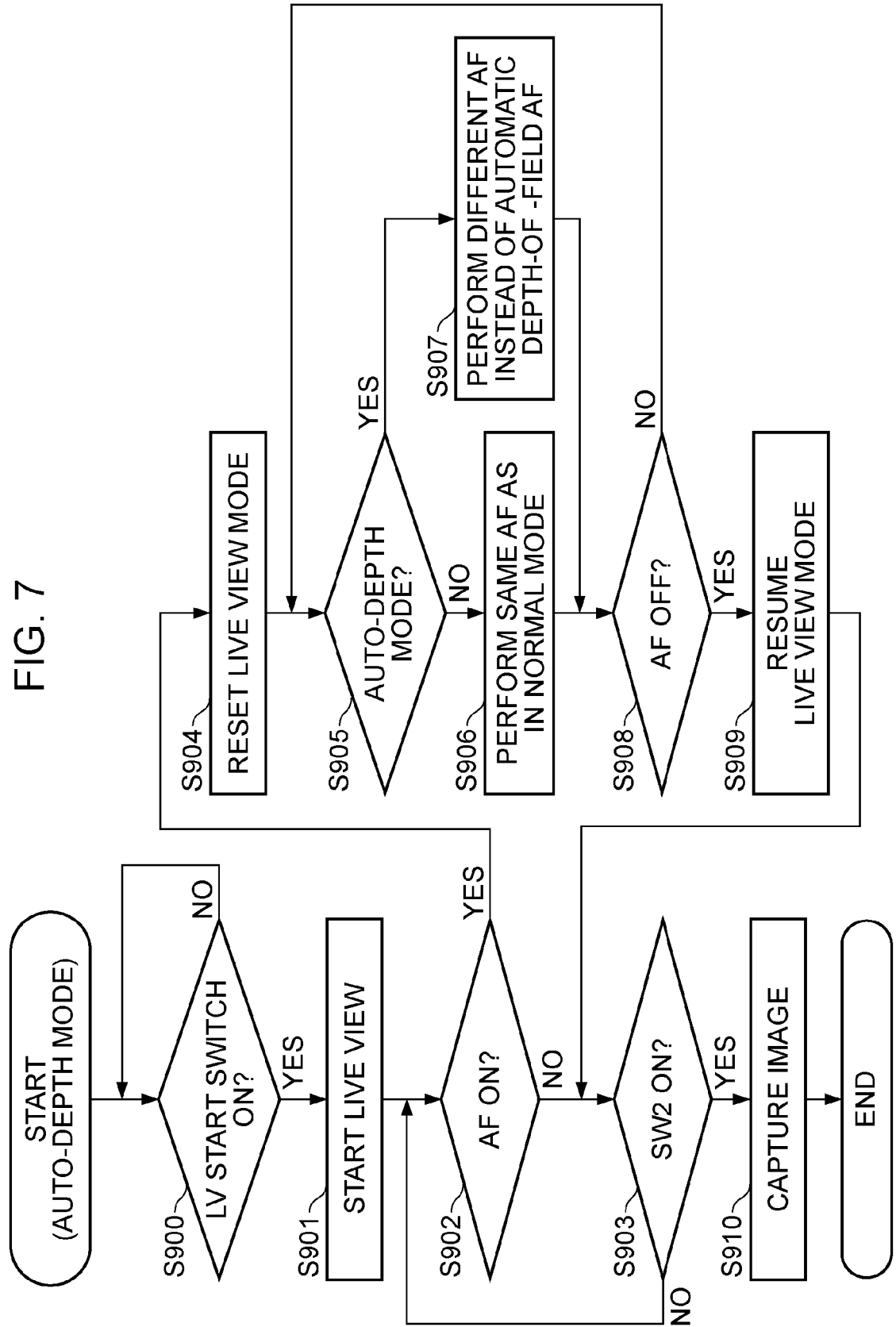
FIG. 7 is a flowchart of an example AF-mode switching operation in the live view mode according to the embodiment of the present invention.

When an AF operation is performed by accepting that the AF switch 69 has been turned on in the live view mode and resetting the live view mode, AF is not performed in the auto-depth mode, but in a selected AF mode. The operation in that case is described below using the flowchart shown in FIG. 7.

In step S900, the image pickup apparatus is on standby until the live view start switch 68 is turned on. When the live view start switch 68 is turned on, the flow proceeds to step S901. In step S901, as has been described above, the mirror 130 and the shutter 12 are controlled to enter the live view mode. That is, a live view operation is started.

In step S902, the state of the AF switch 69 is detected. When the AF switch 69 is turned on, the flow proceeds to step S904, and the mirror 130 and the shutter 12 are brought back to the standby state. That is, the live view mode is reset. Thereafter, the flow proceeds to step S905, and the current photographing mode is determined. When the current photographing mode is not the auto-depth mode, the flow proceeds to step S906, and AF in the normal mode is performed in accordance with the photographing mode and the AF mode setting. In contrast, when the photographing mode is the auto-depth mode, the flow proceeds to step S907. In step S907, instead of AF in the auto-depth mode, one-shot AF or servo AF selected by the operation unit 70 as the AF mode is performed.

In step S908, the state of the AF switch 69 is detected. When the AF switch 69 remains to be turned on, the flow returns to step S905, and a similar operation is repeated. When the AF switch 69 is turned off, the flow proceeds to step S909. In step S909, the AF processing is terminated, and the mirror 130 and the shutter 12 are controlled to resume the live view mode.

Thereafter, the flow proceeds to step S903, and the state of the switch SW2 is detected. When the switch SW2 is turned off, the flow returns to step S902, and a similar operation is repeated. When the switch SW2 is turned on, the flow proceeds to step S910, and an image is captured.

When, for example, the servo AF mode is set as the AF mode in the live view mode, even when the current photographing mode is the auto-depth mode, AF giving priority to the depth of field is not performed. Instead, in step S907, the above-described servo AF processing is performed. Accordingly, a photographing operation can be performed even in the live view mode where no AF is performed in the case where the photographing mode is set to the auto-depth mode.

Generally in the auto-depth mode, besides focus adjustment based on the photometric result, the photographing aperture size is additionally determined. Thus, AF needs to be performed prior to capturing an image. In the live view mode of the present embodiment, since an image can be captured without operating the AF switch 69, the live view mode is not compatible with the auto-depth mode. Since the photographing aperture size may be updated every time AF is performed in the auto-depth mode, when auto-depth AF is performed using the AF switch 69, the photographing aperture size becomes void at the time the AF switch 69 is turned off and the live view mode is resumed. When a user of the image pickup apparatus instantly thinks of performing AF in such a state, AF can be performed in, for example, the servo AF mode so that there are no effects on the photometric result in the live view mode.

Figure 8:
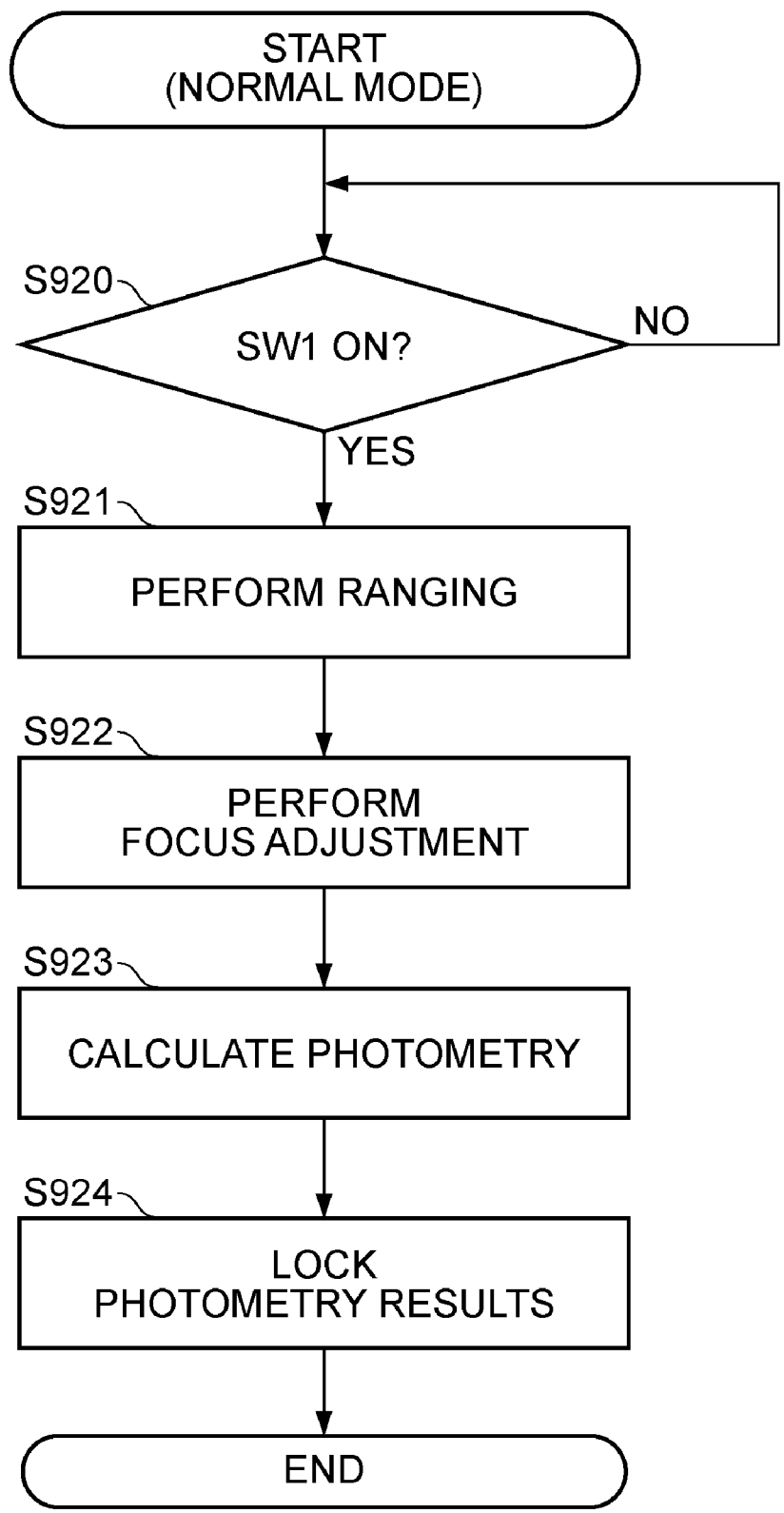
FIG. 8 is a flowchart of an example AF lock operation after focus is achieved according to the embodiment of the present invention.

An operation in the case where the one-shot AF mode is selected as the AF mode and evaluation photometry is selected as the photometry mode in the normal mode is described below using the flowchart shown in FIG. 8.

In step S920, the image pickup apparatus is on standby until the switch SW1 is turned on. When the switch SW1 is turned on, the flow proceeds to step S921, and ranging is performed. In this case, if an arbitrary point is selected by the user from among a plurality of ranging points, focus adjustment is performed based on the selected ranging point (S922). Alternatively, if automatic selection has been set, focus adjustment is performed based on an automatically determined ranging point (S922).

In step S923, evaluation photometry is performed mainly using the focus ranging point, and photometric results are calculated. In step S924, the calculated photometric results (aperture size and shutter speed) are locked (AE-locked). The photometric results locked in this manner after focus is achieved remain constant even when the angle of view is changed while maintaining the on-state of the switch SW1 or even when the luminance of the object changes.

Figure 9:
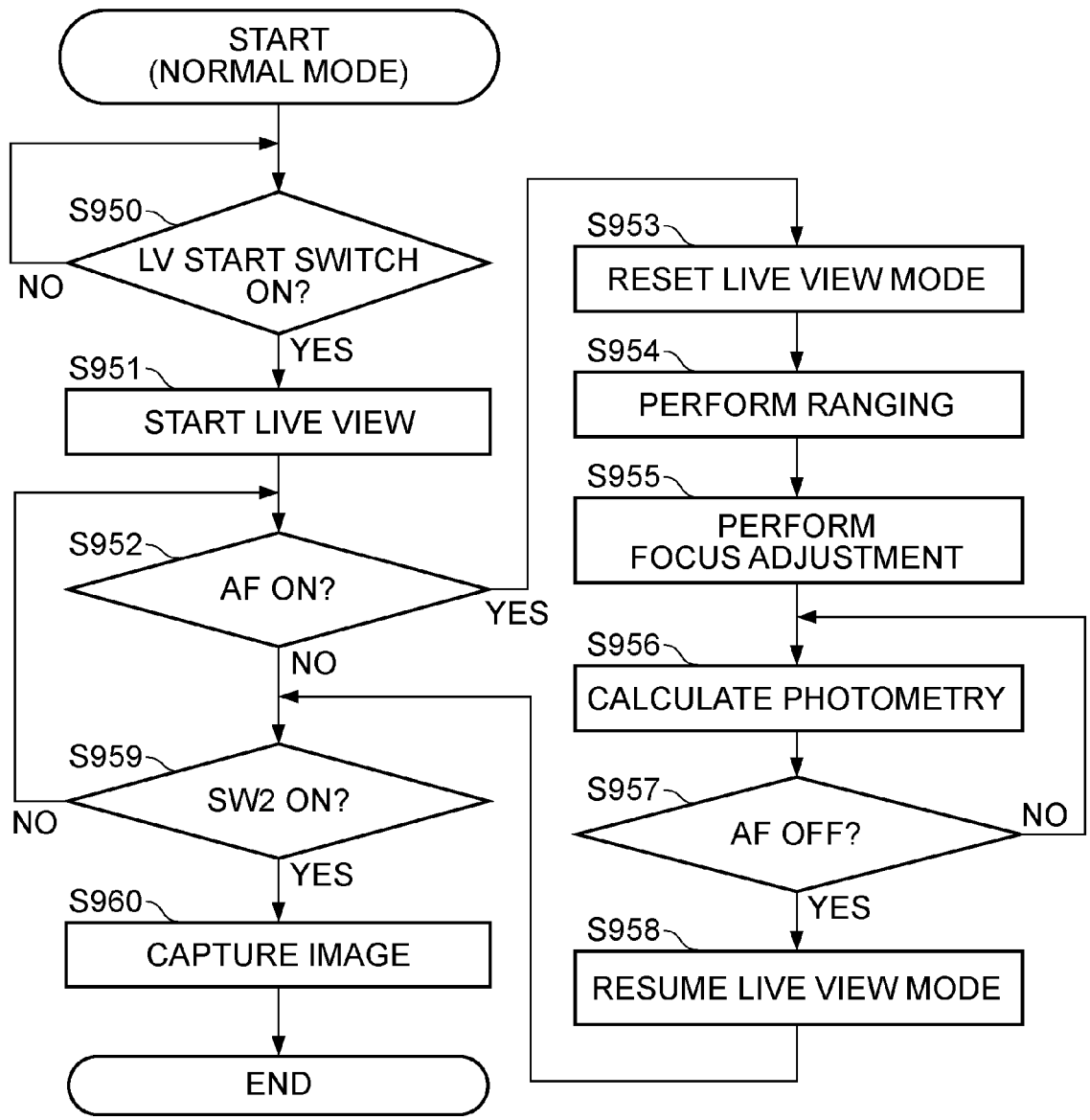
FIG. 9 is a flowchart of an example operation where no AF lock operation is performed after focus is achieved according to the embodiment of the present invention.

When the mode is changed to the live view mode with the foregoing settings, the operation is switched so that the photometric results will not be locked after focus is achieved. That is, when an AF operation is performed using the phase-difference AF method by accepting that the AF switch 69 has been turned in the live view mode on and resetting the live view mode, the photometric results are not locked after focus is achieved. This is because of the following reasons. That is, locking of the photometric results after focus is achieved is effective based on the assumption that an image is instantly captured after AF focus is achieved. In the live view mode, AF is only an option (that means that AF is not essential to capturing an image), and there are no explicit means to reset the in-focus state. Therefore, when the photometric results are locked after the phase-difference AF processing is performed, the result may be different from that intended by a photographer. When the photometer 46 and the image processing unit 20 have different photometry algorithms, exposure at the time of capturing an image may be different when AF is performed and when no AF is performed. An operation in such a case is described below using the flowchart of FIG. 9.

In step S950, the image pickup apparatus is on standby until the live view start switch 68 is turned on. When the live view start switch 68 is turned on, the flow proceeds to step S951. In step S951, as has been described above, the mirror 130 and the shutter 12 are controlled to enter the live view mode. That is, a live view operation is started.

In step S952, the state of the AF switch 69 is detected. When the AF switch 69 is turned on, the flow proceeds to step S953, and the mirror 130 and the shutter 12 are brought back to the standby state. That is, the live view mode is reset. Thereafter, the flow proceeds to step S954, and ranging is performed. In this case, if an arbitrary point is selected by the user from among a plurality of ranging points, the selected point is determined as a ranging point. In step S955, focus adjustment is performed based on the selected ranging point. Alternatively, if automatic selection has been set, focus adjustment is performed based on an automatically determined ranging point.

In step S956, evaluation photometry is performed by the photometer 46 mainly using the focus ranging point, and photometric results are calculated. Thereafter, the process proceeds to step S957. Photometric calculations are repeated in step S956 and the photometric results are updated until the AF switch 69 is detected to be off. That is, photometry is continuously performed in real-time.

When it is detected in step S957 that the AF switch 69 is turned off, the flow proceeds to step S958, and the mirror 130 and the shutter 12 are controlled to resume the live view mode.

Thereafter, the flow proceeds to step S959, and the state of the switch SW2 is detected. When the switch SW2 is turned off, the flow returns to step S952, and a similar operation is repeated. When the switch SW2 is turned on, the flow proceeds to step S960, and an image is captured.

The foregoing description concerns examples where photometry is performed using the photometer 46 in the case where the AF operation using the phase-difference AF method is performed. However, during the AF operation performed using the ranging unit 42, AE may or may not be performed using the photometer 46. Photometric values used to capture an image are obtained by the image processing unit 20 after the live view mode is resumed. Alternatively, for example, photometry may be performed by the photometer 46, and the photometric values obtained can be used to indicate the photometric values when photometry cannot be performed by the image processing unit 20. Accordingly, unlike the normal photographing mode, the user can feel comfortable with operating the image pickup apparatus when AF is used not as preparation for capturing an image, but as an auxiliary technique. Since the photometric method in the live view mode can be unified to photometry using the image processing unit 20, the user can use the image pickup apparatus without feeling that there is a difference between the image processing unit 20 and the photometer 46.

The image pickup apparatus in the foregoing embodiment has the normal mode using the optical viewfinder 104 and the live view mode using the electrical viewfinder. The image pickup apparatus has the ranging unit 42 for performing an AF operation using the phase-difference AF method, which is enabled when the optical viewfinder 104 is used. In the live view mode, when a photographing mode of performing photometry in association with the AF result is set, the mode is changed to a photographing mode where photometry is performed not in association with the AF result.

The photographing mode where photometry is performed in association with the AF result is the auto-depth mode or a mode where, based on the evaluation photometry results at the focus ranging point, the photometric values are locked when focus is achieved. The photographing mode where photometry is performed not in association with the AF result is the programmed AE mode or a mode where photometry is continuously performed in real-time.

As has been described above, in the present embodiment, the photographing mode where photometry is performed in association with the AF result is switched to the photographing mode where ranging is performed not in association with the AF result. More specifically, when the auto-depth mode is set as the photographing mode, in the live view mode, the auto-depth mode is switched to the programmed AE mode so that an operation is performed. Accordingly, user-friendliness that is not based on an AF operation using the phase-difference AF method can be ensured. In other words, generally in the auto-depth mode, no image is permitted to be captured in an out-of-focus state, and no photographing aperture size is determined. In the live view mode that is not based on an AF operation, no image can be captured without performing AF. However, with the foregoing construction, when the user, who has selected the auto-depth mode in the normal mode using the optical viewfinder 104, suddenly switches the mode to the live view mode, it is possible to overcome a constraint that no image can be directly captured in the live view mode. In other words, even when an AF operation using the phase-difference AF method is performed and then a live view photographing operation is performed, photometric results that are not different from those in the case where an image is directly captured in the live view mode can be ensured.

When a mode where, based on the evaluation photometry results at the focus ranging point, the photometric values are locked when focus is achieved is selected as the photographing mode, the mode is changed to a real-time photometry mode that is unrelated to a phase-difference AF operation. Accordingly, user-friendliness can be improved by avoiding, for example, unnecessary AE locking in the case where phase-difference AF is performed in the live view mode.

That is, an image pickup apparatus that avoids a failure that occurs when the phase-difference AF and the live view mode are combined can be provided.

The image pickup apparatus of the present embodiment includes the mode dial switch 60 for selecting at least one of the programmed AE mode and the auto-depth mode and the operation unit 70 for selecting the auto-focus mode. Furthermore, the image pickup apparatus of the present embodiment includes the AF switch 69 for starting an AF operation using the phase-difference AF method in the live view mode. Suppose that the auto-depth mode is set as the photographing mode during the AF operation using the phase-difference AF method in the live view mode. Even in such a case, an AF operation using an AF method selected by the operation unit 70 (one-shot AF or servo AF) is performed irrespective of the auto-depth mode.

As has been described above, when the auto-depth mode is set as the photographing mode, if an AF operation using the phase-difference AF method is started in the live view mode, AF is performed in a selected AF mode irrespective of the auto-depth mode. Accordingly, AF can be performed without affecting the photometric results obtained in the live view mode.

That is, when the phase-difference AF and the live view mode are combined, the following failures occur:

1) In the auto-depth mode, AF is essential to a photographing operation. In contrast, AF is not essential to the live view mode in the present embodiment (since the AF switch 69 is provided separately from the release button); and 2) In the auto-depth mode, a photographing aperture size necessary for the depth of field is calculated only during AF. In contrast, in the live view mode, AF is terminated and then the live view mode is resumed. Thus, the live view mode is not compatible with the auto-depth mode.

To overcome the failures, no auto-depth operation is performed in the live view mode. However, when the user operates the AF switch 69, AF is performed in accordance with the AF mode that has been set, and focus is achieved.

Accordingly, an image pickup apparatus that can overcome failures that occur when the phase-difference AF and the live view mode are combined, that is, failures in AF and the photometric method that occur when the optical viewfinder and the live view mode can be switched from one to the other, can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-205370 filed Aug. 7, 2007, which is hereby incorporated by reference herein in its entirety.

What is claimed is:

1. An image pickup apparatus that can switch between an optical viewfinder mode for identifying an object using an optical viewfinder and a live view mode for identifying an image of an object using a monitor, the apparatus comprising:
   an auto-focus unit able to be configured in the optical viewfinder mode; and
   a control unit configured to switch, in a case where an automatic depth-of-field photographing mode for performing exposure control in association with an auto-focus result obtained by the auto-focus unit is set, when the optical viewfinder mode is switched to the live view mode, to a programmed photographing mode for performing exposure control not in association with the auto-focus result, 2. The image pickup apparatus according to claim 1, wherein the auto-focus unit is configured to perform auto focus based on a phase difference.

3. The image pickup apparatus according to claim 1, further comprising:
   a first operation member configured to select at least one of the programmed photographing mode and the automatic depth-of-field photographing mode;
   a second operation member configured to select an auto-focus mode; and
   an auto-focus controller configured to enable, when the live view mode is switched to the optical viewfinder mode, even in a case where the automatic depth-of-field photographing mode has been set by the first operation member, the auto-focus unit in the auto-focus mode selected by the second operation member.

4. An image pickup apparatus that can switch between an optical viewfinder mode for identifying an object using an optical viewfinder and a live view mode for identifying an image of an object using a monitor, the apparatus comprising:
   an auto-focus unit able to be configured in the optical viewfinder mode; and
   a control unit configured to switch, in a case where a first mode for performing exposure control in association with an auto-focus result obtained by the auto-focus unit is set, when the optical viewfinder mode is switched to the live view mode, to a second mode for performing exposure control not in association with the auto-focus result,
   wherein the first mode is a mode in which, based on an evaluation photometry result obtained at a focus ranging point, a photometric value obtained when focus is achieved is locked, and the second mode is a mode in which photometry is continuously performed in real-time.

5. The image pickup apparatus according to claim 4, wherein the auto-focus unit is configured to perform auto focus based on a phase difference.

* * * * *